United States Patent Office 2,708,592
Patented May 17, 1955

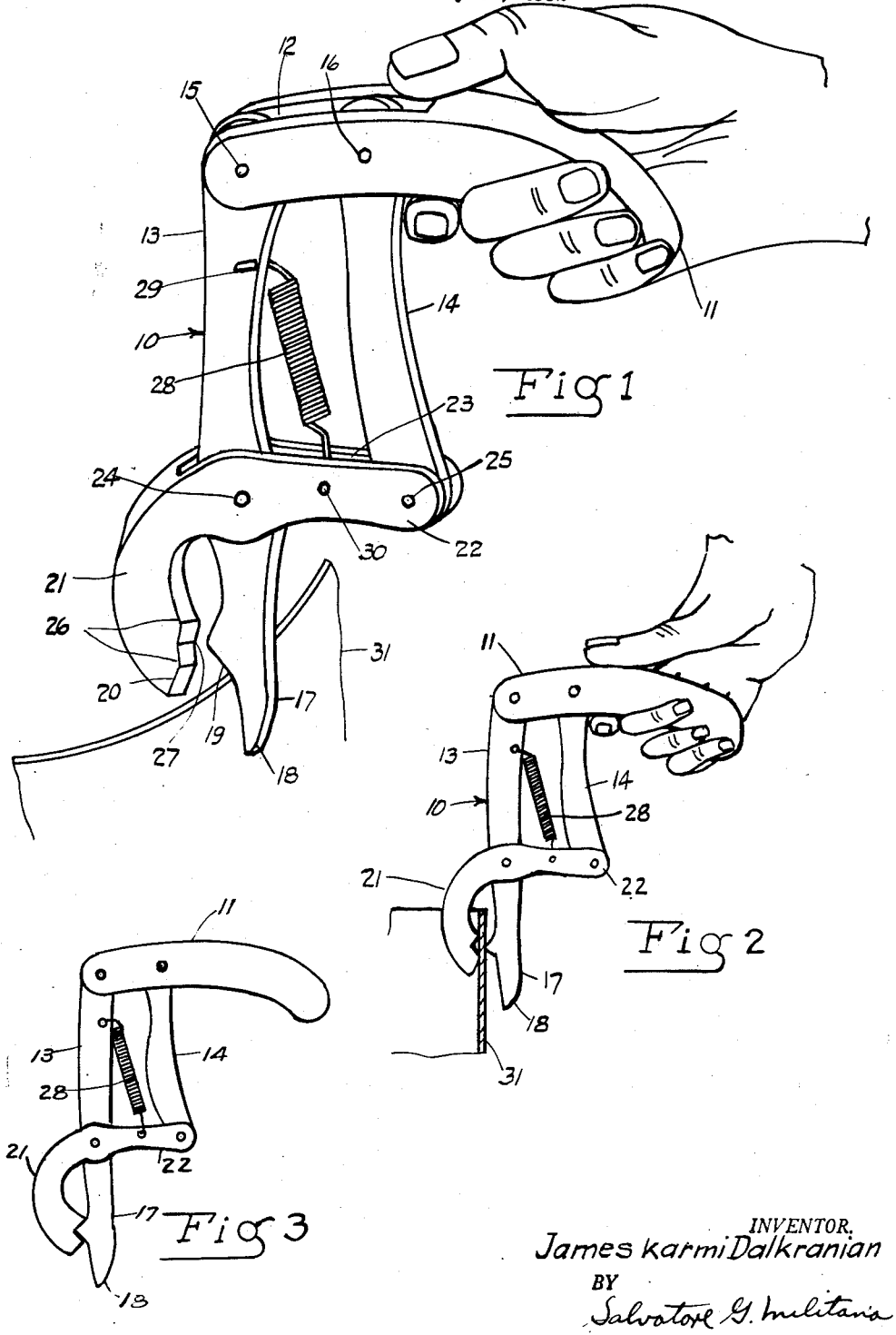

2,708,592
TONGS
James Karmi Dalkranian, Miami, Fla.
Application May 10, 1952, Serial No. 287,190
2 Claims. (Cl. 294—31)

This invention relates generally to tongs, and is more particularly directed to those to be used for picking up and carrying articles such as containers, cans and the like.

It is a principal object of the present invention to provide article picking and carrying tongs, which are simple and economical in construction and most effective in operation.

A further object of the present invention is to provide a pair of tongs especially adapted for use by nurserymen, warehousemen, janitors, etc. for picking up and carrying containers, cans and other articles provided with a lip portion for the tongs to grip thereon requiring a minimum of effort in affixing and releasing the jaws of the tongs from the article.

A still further object of the present invention is to provide a pair of tongs characterized as above, whereby application of a slight downward pressure on the handle of the tongs causes the jaws to open and upon a release of the downward pressure, the jaws automatically grip the article preparatory to lifting and carrying away of the article.

To the attainment of the aforesaid objects and ends, the invention further resides in those novel details of construction which will be first described in detail and then specifically pointed out in the appended claims, reference being had to the accompanying drawings, in which:

Figure 1 is a perspective view of the tongs shown with its jaw members in an opened position prior to being placed in its gripping position.

Figure 2 is a side elevational view of the tongs shown in its gripping position.

Figure 3 is likewise a side elevational view of the tongs shown in its normal non-operating position.

Referring now to the drawings wherein like numerals refer to similar parts throughout the several views, the numeral 10 designates the tongs generally, comprising a handle 11 bifurcated at one end thereof as at 12 in which are pivotally mounted a lever arm 13 and an operating arm 14 by the pivot pins 15 and 16 respectively. The lower or free end of the lever arm 13 is provided with a jaw member 17 terminating in an elongated lip portion 18 and having a projection 19 on the working or gripping edge portion of the jaw member 17. Opposing the jaw member 17 is a second jaw member 21 having its gripping edge portion 20 in coacting relationship with the gripping edge portion 19 of the first jaw member 17. The gripping edge portion 20 of the jaw member 21 is provided with a pair of adjoining projections 26, 26 forming a valley or depression 27 which receives the projection 19 of the jaw member 17 when the tongs 10 are in a closed position (see Figure 3).

The jaw member 21 which is arcuate in construction, as shown by the drawings, is connected to a leg portion 22, the latter being substantially straight in construction and in somewhat parallel relationship with the handle 11. The leg portion 22 is bifurcated along its full length as at 23 through which slot 23 extends the lever arm 13. The members 13 and 22 are pivotally mounted to each other as at 24. The lower or free end of the operating arm 14 is likewise received by the slot 23, and is pivotally mounted as at 25 to the free end of the leg portion 22. A coil spring 28 which extends between the upper portion of the lever arm 13 as at 29 and substantially the mid point of the leg portion 22 as at 30, yieldingly urges the jaw members 17 and 21 to their closed position.

In the normal operation of the tongs 10, a user grasps the handle 11 and positions the lip portion 18 of the jaw member 17 against the end of an article such as the container 31 which he desires to lift and carry away. By exerting a slight downward pressure on the handle 11 sufficiently only to overcome the spring pressure 28, the jaw members 17 and 21 will retract to their opened position as shown by Fig. 1. The pressure being exerted by the user on the handle 10 will cause the jaws 17 and 21 of the tongs 10 to slide downwardly along the edge of the article 31 to the position shown in Figure 2. Now the user exerts an upward pressure or pull on the handle 11, which causes the jaw members 17 and 21 to bite into and hold fast to the article 31 permitting the user then to lift and carry away the tongs 10 with the article 31 securely held thereby.

When the user decides to release the tongs 10 from the article 31 after he has deposited the article where desird, he merely exerts a slight downward pressure on the handle 11, at the same time tilts the tongs 10 towards himself. This causes the jaw members 17 and 21 to assume their retracted or opened position, and also causes the lip portion 18 of the jaw member 17 to abut against the side wall of the container 31. By lifting the tongs 10, the lip portion 18 slides upwardly along the side wall of the article 31 until the jaw member 21 clears the top of the wall of the article 31 when the user releases the pressure being exerted on the handle 11, and the tongs 10 return to its normally closed position by virtue of the spring pressure 28.

While the preferred form of the invention has been here disclosed, it is understood that various changes may be made in its construction by those skilled in the art without departing from the spirit of the invention as defined in the appended claims.

Having thus described my invention, what I claim and desire to secure by Letters Patent is:

1. A device of the class described comprising a handle, a first lever member pivotally mounted at an end portion of said handle, a second lever member pivotally mounted on said first lever member, said second lever member having one end extending downwardly along a lower portion of said first lever member and the other end in substantially parallel relation with said handle, said first named end of said second lever having a recess, a link pivotally mounted at one end to said handle and at its other end to said other end of said second lever member, a prong contained on said lower portion of said first lever member constructed and arranged to be received by said recess when said one end of said second lever and said first lever member are in abutting relationship and a tip portion contained on said lower portion of said first lever extending beyond said one end of said second lever.

2. A device of the class described comprising an elongated handle, a first lever member pivotally mounted at an end portion of said elongated handle, a second lever member pivotally mounted on said first lever member at a lower portion thereof, said second lever member having one end arcuate in shape whereby said one end extends in the same direction as said lower portion of said first lever member and its other end extending in substantial parallel relation with said elongated handle, a link pivotally connecting said handle and said other end of said second lever member, a prong contained on said lower portion of said first lever member adjacent the end thereof, said arcuate end portion of said second lever member having a recess constructed and arranged to receive said prong on said first lever member, a tip portion contained on said lower portion of said first lever member and extending beyond said arcuate end portion of said second lever member, and a spring extending between the upper portion of said first lever member and said other end portion of said second lever member, said spring yieldingly urging said prong and said recess into coacting relationship.

References Cited in the file of this patent

UNITED STATES PATENTS

| | | |
|---|---|---|
| 847,841 | Stanley | Mar. 19, 1907 |
| 1,061,175 | Guy et al. | May 6, 1913 |
| 1,453,812 | Thomas | May 1, 1923 |

FOREIGN PATENTS

| | | |
|---|---|---|
| 6,395 | Sweden | Feb. 27, 1895 |
| 23,229 | Sweden | Dec. 19, 1906 |